(12) United States Patent
Feng et al.

(10) Patent No.: US 12,011,788 B2
(45) Date of Patent: Jun. 18, 2024

(54) CRAWLING WELDING ROBOT

(71) Applicant: BEIJING BO TSING TECH CO., LTD., Beijing (CN)

(72) Inventors: Xiaobing Feng, Beijing (CN); Jiluan Pan, Beijing (CN); Lisheng Gao, Beijing (CN)

(73) Assignee: BEIJING BO TSING TECH CO., LTD., Beijing (CN)

( * ) Notice: Subject to any disclaimer, the term of this patent is extended or adjusted under 35 U.S.C. 154(b) by 973 days.

(21) Appl. No.: 16/970,158

(22) PCT Filed: Apr. 28, 2020

(86) PCT No.: PCT/CN2020/087549
§ 371 (c)(1),
(2) Date: Aug. 14, 2020

(87) PCT Pub. No.: WO2020/259068
PCT Pub. Date: Dec. 30, 2020

(65) Prior Publication Data
US 2022/0258291 A1    Aug. 18, 2022

(30) Foreign Application Priority Data
Jun. 22, 2019 (CN) .......................... 201910545400.3

(51) Int. Cl.
*B23K 37/00* (2006.01)
*B23K 37/02* (2006.01)
(Continued)

(52) U.S. Cl.
CPC ...... *B23K 37/0282* (2013.01); *B23K 37/0294* (2013.01); *B62D 55/104* (2013.01);
(Continued)

(58) Field of Classification Search
CPC ............ B23K 37/0294; B23K 37/0282; B23K 37/0241; B23K 9/127; B23K 37/0252;
(Continued)

(56) References Cited

U.S. PATENT DOCUMENTS

| 263,226 A | * | 8/1882 | Rogers | ...................... B02C 7/14 |
| | | | | 144/208.91 |
| 1,424,441 A | * | 8/1922 | Best | ...................... B62D 55/205 |
| | | | | 474/224 |

(Continued)

FOREIGN PATENT DOCUMENTS

| CN | 201580461 U | 9/2010 |
| CN | 107600214 A | 1/2018 |

(Continued)

OTHER PUBLICATIONS

International Search Report mailed Aug. 10, 2020 in International Application No. PCT/CN2020/087549, with English translation, 6 pages.

(Continued)

*Primary Examiner* — Erin B Saad
(74) *Attorney, Agent, or Firm* — Nixon & Vanderhye P.C.

(57) ABSTRACT

The invention relates to a welding technical field and provides a crawling welding robot. The crawling welding robot includes a vehicle chassis and two crawler wheels connected to two opposite sides of the vehicle chassis, respectively, wheel carriers of two crawler wheels are movably connected with the vehicle chassis. In this way, when the crawling welding robot moves on a non-planar surface for welding, the two crawler wheels can freely adjust its posture relative to the vehicle chassis to adapt to the surface for welding and improve a degree of fit between the two crawler wheels and the surface for welding, making the moving direction of the crawling welding robot easier to be (Continued)

controlled and reducing a probability of the crawling welding robot slipping or falling from the surface for welding.

9 Claims, 16 Drawing Sheets

(51) Int. Cl.
*B62D 55/104* (2006.01)
*B62D 55/12* (2006.01)
*B62D 55/20* (2006.01)
*B62D 55/30* (2006.01)

(52) U.S. Cl.
CPC ............. *B62D 55/12* (2013.01); *B62D 55/20* (2013.01); *B62D 55/305* (2013.01)

(58) Field of Classification Search
CPC B23K 37/0288; B62D 57/024; B62D 55/084; B62D 55/10; B62D 55/108; B62D 55/116; B62D 55/205; B62D 55/30
See application file for complete search history.

(56) References Cited

U.S. PATENT DOCUMENTS

| | | | | |
|---|---|---|---|---|
| 2,055,527 | A * | 9/1936 | Glaum, Jr. | B23K 37/0241 |
| | | | | 266/70 |
| 3,764,777 | A * | 10/1973 | Sakabe | B23K 37/0264 |
| | | | | 228/45 |
| 6,627,004 | B1 * | 9/2003 | Lockhart | B23K 37/0252 |
| | | | | 266/73 |
| 6,917,013 | B2 * | 7/2005 | Kondo | B23K 37/0247 |
| | | | | 219/124.31 |
| 7,498,542 | B2 * | 3/2009 | Pan | B23K 9/127 |
| | | | | 219/124.1 |
| 8,605,145 | B2 * | 12/2013 | Webster | F22B 37/38 |
| | | | | 348/82 |
| 9,724,789 | B2 * | 8/2017 | Matthews | B23K 37/0282 |
| 9,776,272 | B2 * | 10/2017 | Einav | B23K 37/0282 |
| 10,307,797 | B1 * | 6/2019 | Newmeister | B08B 1/008 |
| 10,442,025 | B2 * | 10/2019 | Jones | B23K 37/0288 |
| 11,103,950 | B2 * | 8/2021 | Elcic | B23K 37/0247 |
| 11,504,790 | B2 * | 11/2022 | Jones | B23K 10/00 |
| 2004/0239092 | A1 | 12/2004 | Haringer | |
| 2004/0256369 | A1 * | 12/2004 | Kondo | B23K 9/1278 |
| | | | | 219/124.31 |
| 2006/0144835 | A1 * | 7/2006 | Pan | B23K 37/0264 |
| | | | | 219/124.34 |
| 2010/0080679 | A1 * | 4/2010 | Stebbins, Jr. | B61B 1/00 |
| | | | | 414/678 |
| 2012/0111843 | A1 * | 5/2012 | Beard | B23K 37/0264 |
| | | | | 219/136 |
| 2020/0030919 | A1 * | 1/2020 | Svedlund | B23K 11/318 |
| 2021/0291289 | A1 * | 9/2021 | Feng | B23K 37/0247 |
| 2022/0063739 | A1 * | 3/2022 | Li | B62D 55/10 |

FOREIGN PATENT DOCUMENTS

| | | |
|---|---|---|
| CN | 109396700 A | 3/2019 |
| CN | 210121738 U | 3/2020 |
| JP | 47-44716 A | 12/1972 |
| JP | 49-129652 A | 12/1974 |
| JP | 60-18463 A | 1/1985 |
| JP | 2-127977 A | 5/1990 |
| JP | 10-230359 A | 9/1998 |
| RU | 95112777 A1 | 8/1996 |
| RU | 18247 U1 | 6/2001 |
| RU | 2310574 C2 | 11/2007 |
| RU | 2648919 C2 | 3/2018 |
| RU | 2679792 C2 | 2/2019 |
| SU | 1588621 A1 | 8/1990 |

OTHER PUBLICATIONS

Written Opinion of the International Searching Authority mailed Aug. 10, 2020 in International Application No. PCT/CN2020/087549, with English translation, 9 pages.
International Preliminary Report on Patentability Issued Dec. 28, 2021 in International Application No. PCT/CN2020/087549, with English translation, 11 pages.
Notice of Reasons for Rejection mailed Dec. 21, 2021 in Japanese Application No. 2020-539197, with English translation, 5 pages.
Russian Office Action mailed Sep. 5, 2022 in Russian Application No. 2021133483/05(070751), with English translation, 11 pages.
Substantive Examination Report Notice mailed Jul. 1, 2022 in Saudi Arabian Application No. 521421524, with English translation, 10 pages.

* cited by examiner

CRAWLING WELDING ROBOT

This application is the U.S. national phase of International Application No. PCT/CN2020/087549 filed Apr. 28, 2020 which designated the U.S. and claims priority to CN Patent Application No. 201910545400.3 filed Jun. 22, 2019, the entire contents of each of which are hereby incorporated by reference.

TECHNICAL FIELD

The invention relates to a welding technical field, and more particularly to a crawling welding robot.

BACKGROUND

With the development of robotics and welding technology, in a field of metal structure welding, crawling welding robots are generally adopted for welding steel tanks, spherical tanks, and equipment for pipeline arc surface. Currently, there is a type of crawling welding robot, which is driven by crawler wheels and moves on a surface for welding. However, for a non-planar surface for welding such as an arc surface or a spherical surface, the crawler wheels of the crawling welding robot typically cannot fully contact with the surface for welding, resulting in difficulties in controlling a moving direction of the welding robot, and even causing the crawling welding robot to slip or fall from the surface for welding.

SUMMARY

The purpose of the present invention is to provide a crawling welding robot, which is intended to solve the problem that the crawling welding robot in the prior art is difficult to control its moving direction when moving on a non-planar surface for welding, and may even slip or fall from the surface for welding.

The present invention is achieved by a crawling welding robot for crawling on and welding a workpiece to be welded, including a vehicle chassis, two crawler wheels connected to two opposite sides of the vehicle chassis, respectively, and a welding torch connected to the vehicle chassis and used for welding, where the crawler wheels each includes a wheel carrier, a first sprocket and a second sprocket rotatably connected to two ends of the wheel carrier, respectively, and a chain disposed around the first sprocket and the second sprocket, two wheel carriers of the two crawler wheels are movably connected to the opposite sides of the vehicle chassis, respectively.

Further, the crawling welding robot includes hinges, through which the two wheel carriers are connected with the vehicle chassis, and the hinges are rotatably connected to the wheel carrier and/or the vehicle chassis and each have a rotation axis extending in a moving direction of the crawler wheels.

Further, the crawling welding robot further includes a molten pool observation module for observing welding conditions of the welding torch; the molten pool observation module includes a camera component for photographing the molten pool, and a shielding component for shielding from spatters, which includes a first shielding member having a first light-transmitting hole, and a light-transmitting baffle located between the first shielding member and the camera component and covering the first light-transmitting hole to be shielded from the spatters; the camera component is configured to photograph the molten pool through the first light-transmitting hole; an area of the light-transmitting baffle is at least twice the area of the first light-transmitting hole and is movable relative to the first light-transmitting hole, so that a varied region of the light-transmitting baffle covers the first light-transmitting hole.

Further, the molten pool observation module further includes a rotating shaft, to which the light-transmitting baffle is rotatably connected.

Further, the shielding component further includes a second shielding member located between the first shielding member and the camera component, the second shielding member is provided with a second light transmitting hole opposite to the first light transmitting hole, the camera component is configured to photograph the molten pool through the first light transmitting hole and the second light transmitting hole, the first light transmitting hole and the second light transmitting hole cooperate to define an accommodating space therebetween, within which the light-transmitting baffle is located, the rotating shaft is connected with the first and/or second shielding member.

Further, the light-transmitting baffle is of a cylindrical shape, the rotating shaft is rotatably connected to a center of the light-transmitting baffle, and the accommodating space has a notch, at which the light-transmitting baffle is exposed.

Further, the crawling welding robot further includes magnetic adsorption devices for adsorbing the workpiece to be welded and lifting mechanisms disposed on the vehicle chassis and configured for raising and lowering the magnetic adsorption devices, the vehicle chassis is provided with through holes, the lifting mechanism includes an adjusting screw passing through the through hole and connected at one end with the magnetic adsorption device, and an adjusting nut located at the side of the vehicle chassis away from the magnetic adsorption device and threadedly connected with the adjusting screw, the lifting mechanism further includes a circumferential stopper fixedly disposed at the vehicle chassis and configured for restricting a rotation of the adjusting screw.

Further, the circumferential stopper has a clamping hole and is disposed around the adjusting screw, the clamping hole is D-shaped and claims on an outer periphery of the adjusting screw to restrict the rotation of the adjusting screw, the adjusting screw includes a sliding connection section which slidably cooperates with the clamping hole, and a cross-sectional shape of the sliding connection section matches the shape of the clamping hole and is D-shaped.

Further, the crawler wheel further includes a first tensioning mechanism connected to the wheel carrier and configured for adjusting a tension of the chain in a first direction, and a second tensioning mechanism connected to the wheel carrier and configured for adjusting a tension of the chain in a second direction different from the first direction.

Further, the first direction is a lateral direction consistent with a moving direction of the crawler wheel, and the second direction is a longitudinal direction perpendicular to the lateral direction.

The technical effects of the present invention compared with the prior art lie in that the crawling welding robot according to the present invention includes a vehicle chassis and two crawler wheels connected to two opposite sides of the vehicle chassis, respectively, wheel carrier of two crawler wheels are movably connected with the vehicle chassis. In this way, when the crawling welding robot moves on a non-planar surface for welding, the two crawler wheels can freely adjust its posture relative to the vehicle chassis to adapt to the surface for welding and improve a degree of fit between the two crawler wheels and the surface for welding, making the moving direction of the crawling welding robot easier to be controlled and reducing a probability of the crawling welding robot slipping or falling from the surface for welding.

BRIEF DESCRIPTION OF THE DRAWINGS

For more clearly explaining technical solutions of embodiments of the present invention, the drawings required for the embodiments of the present invention or the description of the prior art will be briefly introduced below. Obviously, the drawings described below are only for some embodiments of the invention. Those skilled in the art can obtain other embodiments based on these drawings without paying any creative labor.

LIST OF REFERENCE NUMERALS

Figure 1:
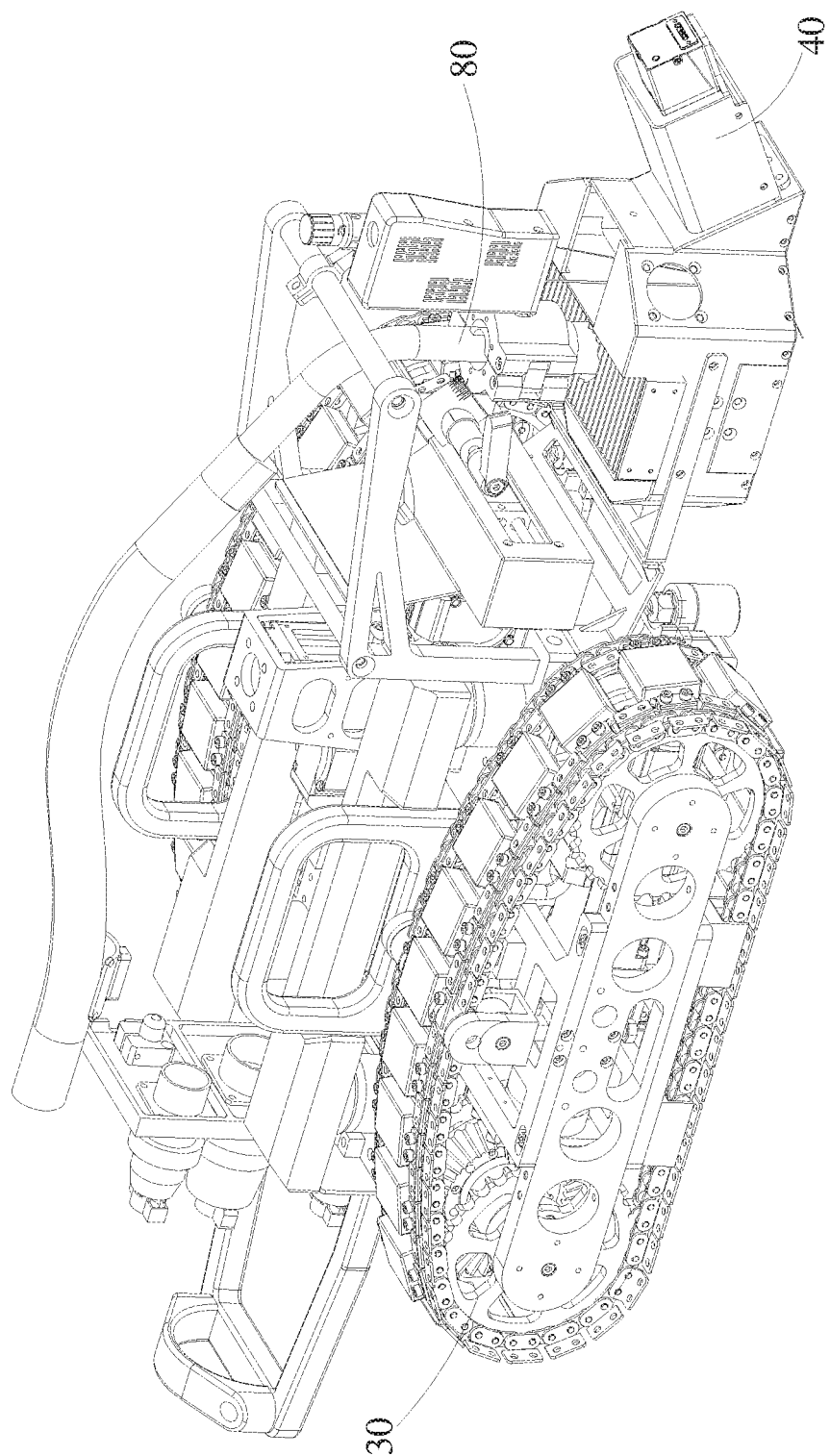
FIG. 1 is a perspective view showing a crawling welding robot according to an embodiment of the present invention.
Figure 2:
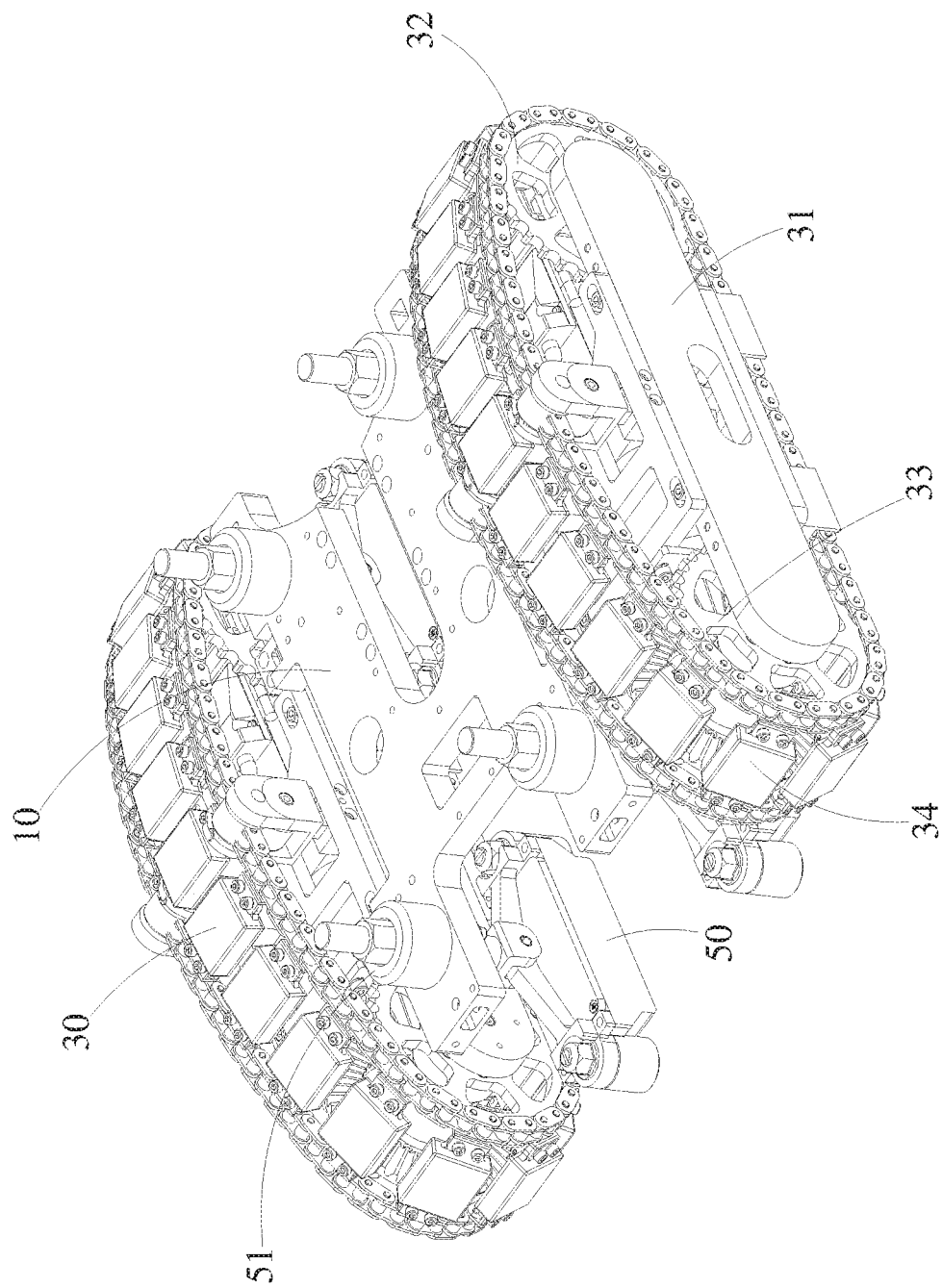
FIG. 2 is a perspective view showing a crawling welding robot according to an embodiment of the present invention.

| | |
|---|---|
| 10 | Vehicle Chassis |
| 20 | Hinge |
| 30 | Crawler wheels |
| 31 | Wheel Carrier |
| 32 | First Sprocket |
| 33 | Second Sprocket |
| 34 | Chain |
| 40 | Molten Pool Observation Module |
| 41 | Camera component |
| 421 | First Shielding Member |
| 4211 | First Light-transmitting Hole |
| 422 | Second Shielding Member |
| 4221 | Second Light-transmitting Hole |
| 423 | Accommodating Space |
| 4231 | Notch |
| 43 | Light-transmitting Baffle |
| 44 | Rotating shaft |
| 50 | Magnetic adsorption device |
| 51 | Lifting mechanism |
| 52 | Through Hole |
| 53 | Adjusting Screw |
| 531 | Sliding Connection Section |
| 54 | Adjustment Nut |
| 55 | Circumferential Stopper |
| 551 | Clamping Hole |
| 60 | First Tensioning Mechanism |
| 70 | Second Tensioning Mechanism |
| 80 | Welding Torch |
| 90 | Molten Pool |

DETAILED DESCRIPTION OF THE PREFERRED EMBODIMENTS

Hereinafter, the embodiments of the present invention will be described in detail. Examples of the embodiments are shown in the drawings, in which the same or similar reference numerals indicate the same or similar elements or elements having the same or similar functions throughout. The embodiments described below with reference to the accompanying drawings are exemplary, which are intended to interpret the present invention, and should not be construed as limiting the present invention.

In the description of the present invention, it should be noted that when an element is referred to as being "fixed" or "disposed" on another element, it can be directly or indirectly on the other element. When an element is referred to as being "connected to" another element, it can be directly or be indirectly connected to the other element.

It should be understood that the terms, such as "length", "width", "upper", "lower", "front", "back", "left", "right", "vertical", "horizontal", "top", "bottom", "inner", "outer", indicate the orientation or positional relationship based on the orientation or positional relationship shown in the drawings, only for facilitating the description of the present invention and simplifying the description, rather than indicating or implying that the devices or elements are required to have a specific orientation and are constructed and operated in a specific orientation, and thus cannot be understood as a limitation to the present invention.

In addition, the terms "first" and "second" are only used for description purposes and cannot be understood as indicating or implying relative importance or implicitly indicating the number of technical features indicated. Thus, the features defined by "first" and "second" may explicitly or implicitly include one or more of said features. In the description of the present invention, "a plurality of" indicates two or more, unless otherwise specified.

Those skilled in the art can understand the specific meanings of the above terms in the present invention according to specific situations.

For making the objectives, technical solutions and advantages of the present invention more clearly, the present invention will be further described in detail below with reference to the accompanying drawings and embodiments.

As shown in FIGS. 1 to 4, a crawling welding robot according to an embodiment of the present invention is used to crawl on and weld a workpiece to be welded. The crawling welding robot includes a vehicle chassis 10, two crawler wheels 30 connected on two opposite sides of the vehicle chassis 10, respectively, and a welding torch 80 connected to the vehicle chassis 10 and used for welding. The crawler wheel 30 includes a wheel carrier 31, a first sprocket 32 and a second sprocket 33 rotatably connected to both ends of the wheel carrier 31, respectively, and a chain 34 disposed around the first sprocket 32 and the second sprocket 33. The wheel carriers 31 of the two crawler wheels 30 are respectively movably connected to two opposite sides of the vehicle chassis 10.

As shown in FIGS. 1 to 4, the crawling welding robot according to the embodiment of the present invention includes the vehicle chassis 10 and two crawler wheels 30 disposed on two opposite sides of the vehicle chassis 10. The wheel carriers 31 of the two crawler wheels 30 are movably connected to the vehicle chassis 10, so that when the crawling welding robot moves on the non-planar surface for welding, the two crawler wheels 30 can freely adjust its posture relative to the vehicle chassis 10 to adapt to the surface for welding and improve a degree of fit between the two crawler wheels 30 and the surface for welding, making the moving direction of the crawling welding robot easier to be controlled and reducing the probability of the crawling welding robot slipping or falling from the surface for welding.

Figure 3:
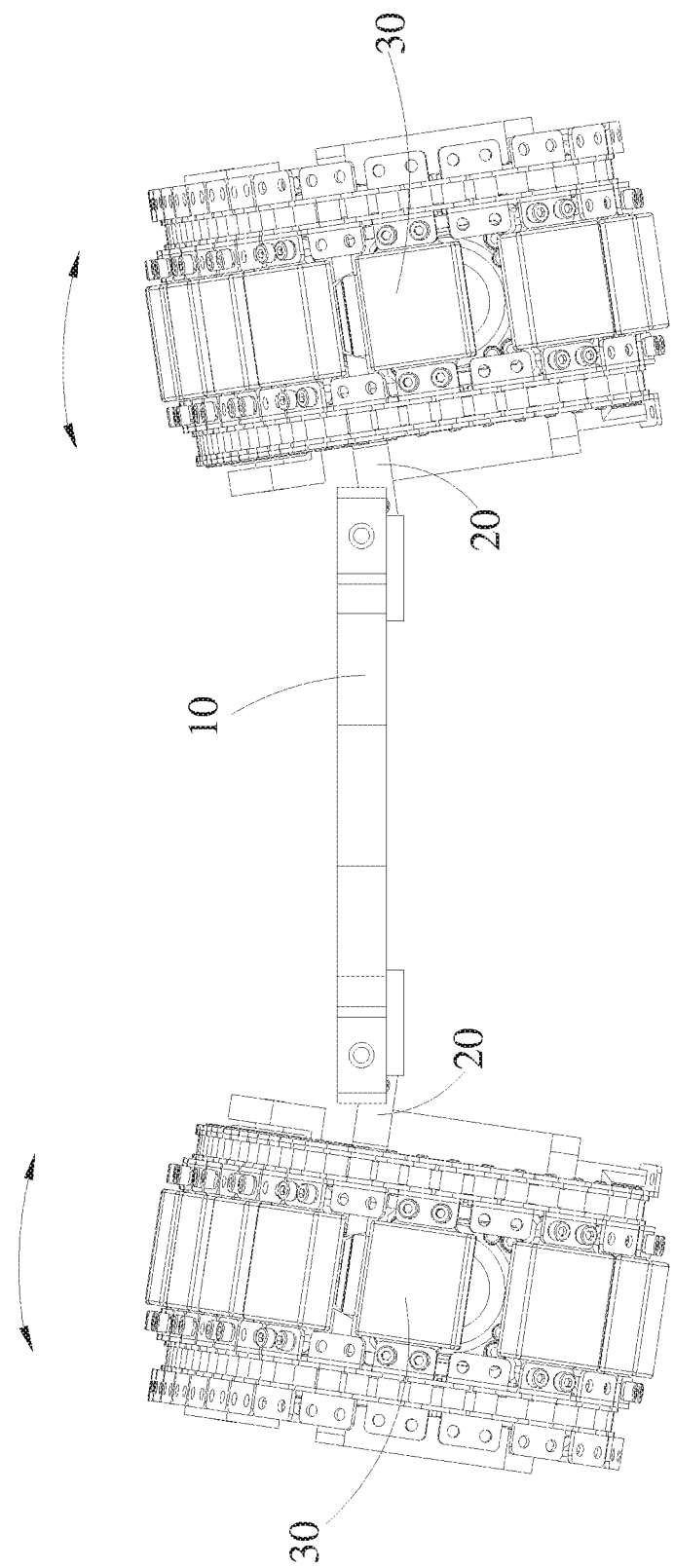
FIG. 3 is a perspective view showing a crawling welding robot according to an embodiment of the present invention.
Figure 4:
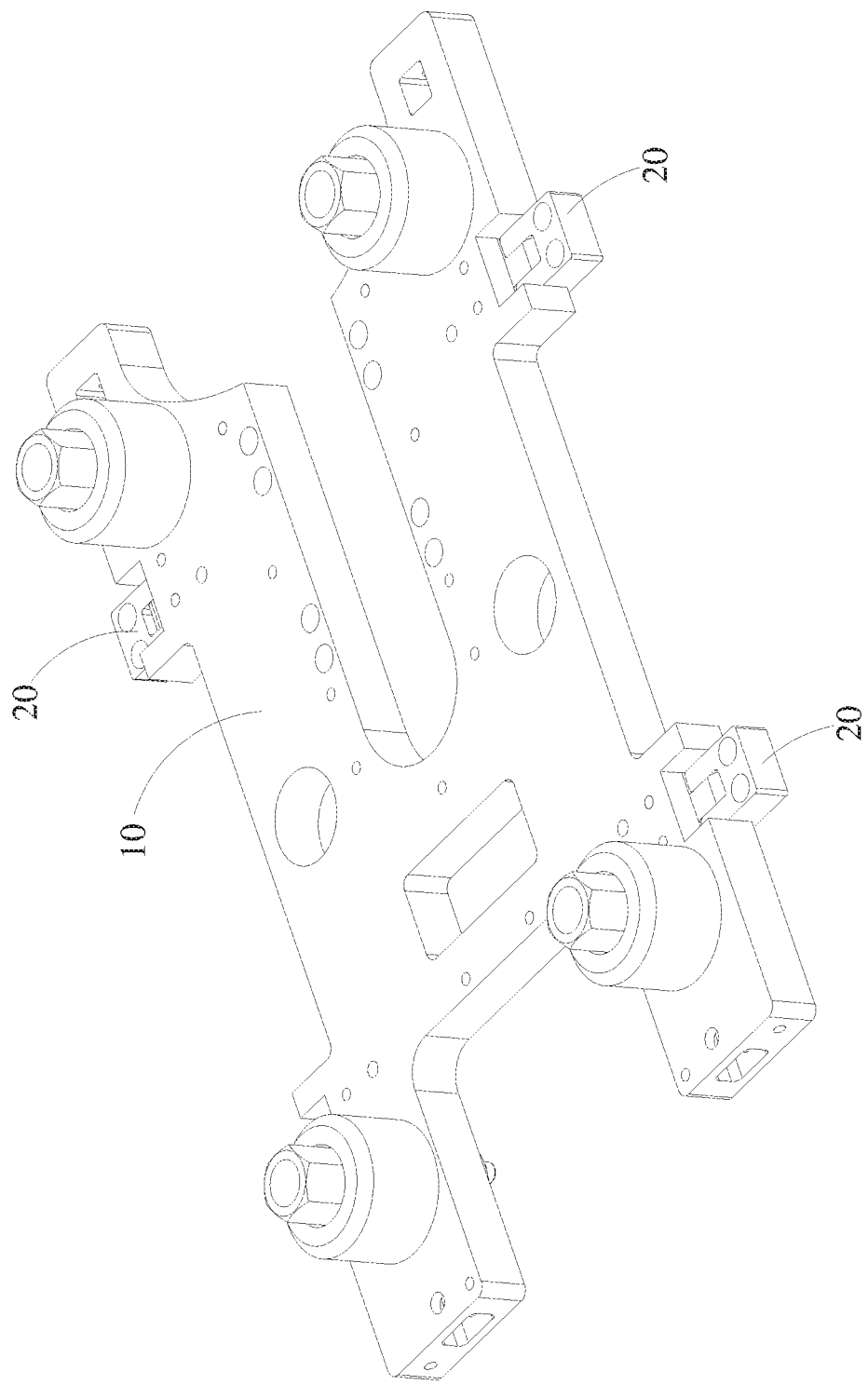
FIG. 4 is a perspective view showing a vehicle chassis according to an embodiment of the present invention.
Figure 5:
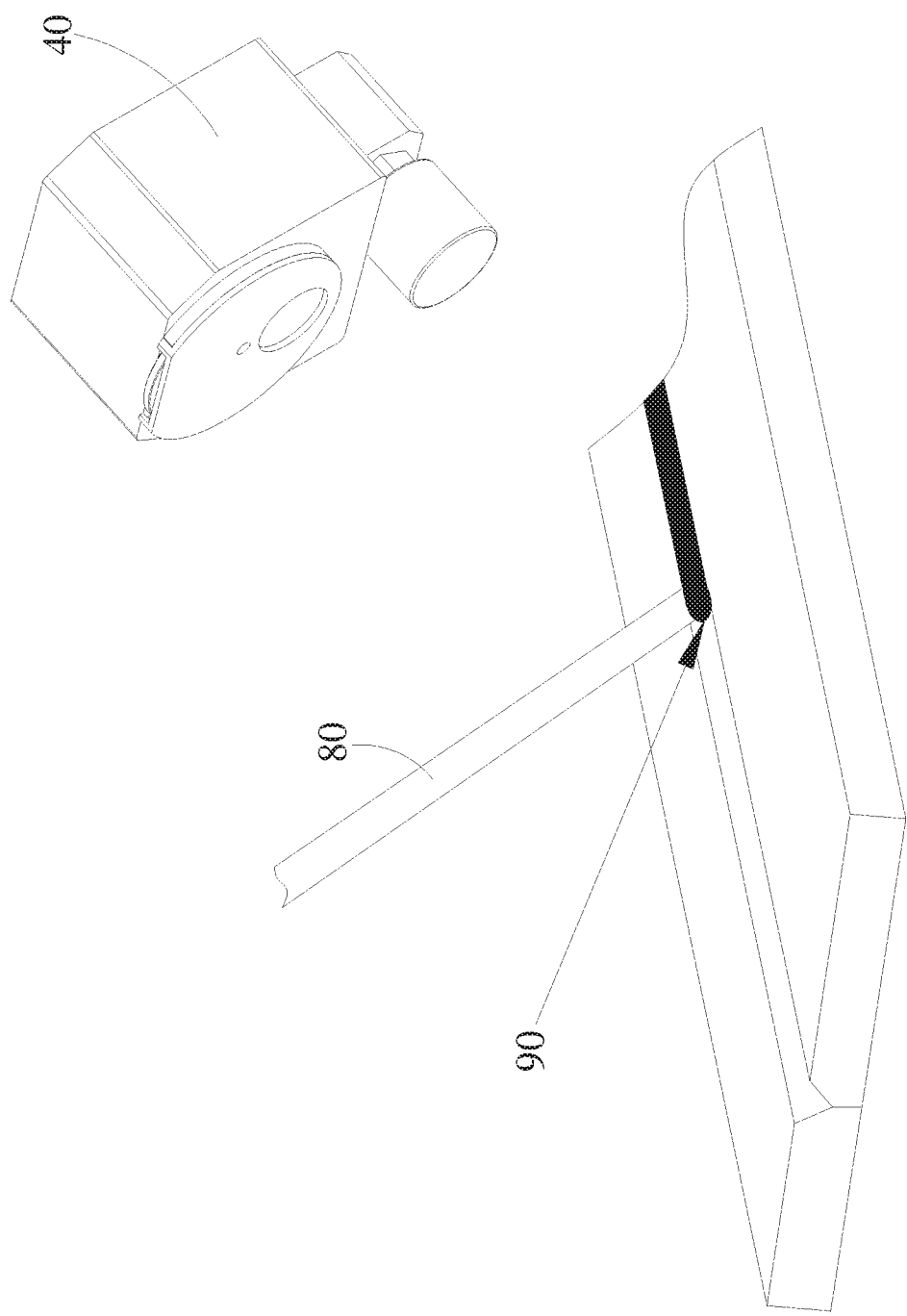
FIG. 5 is a schematic diagram showing a use state of a molten pool observation module according to an embodiment of the present invention.
Figure 6:
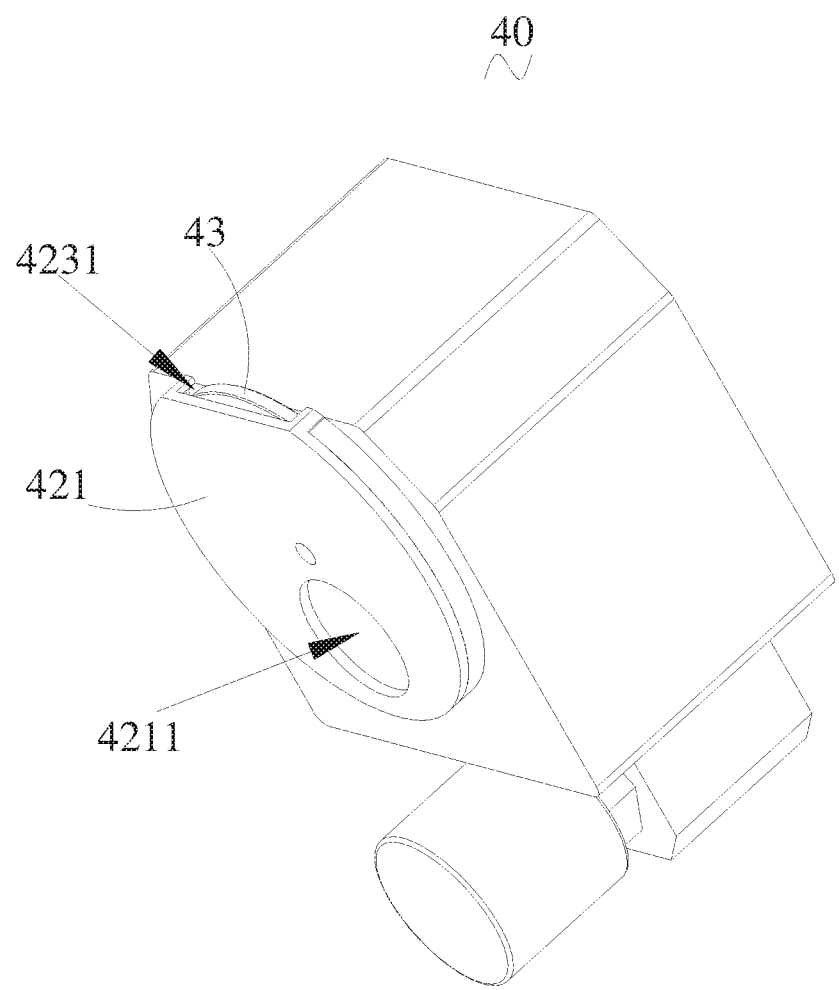
FIG. 6 is a perspective view showing the molten pool observation module according to an embodiment of the present invention.
Figure 7:
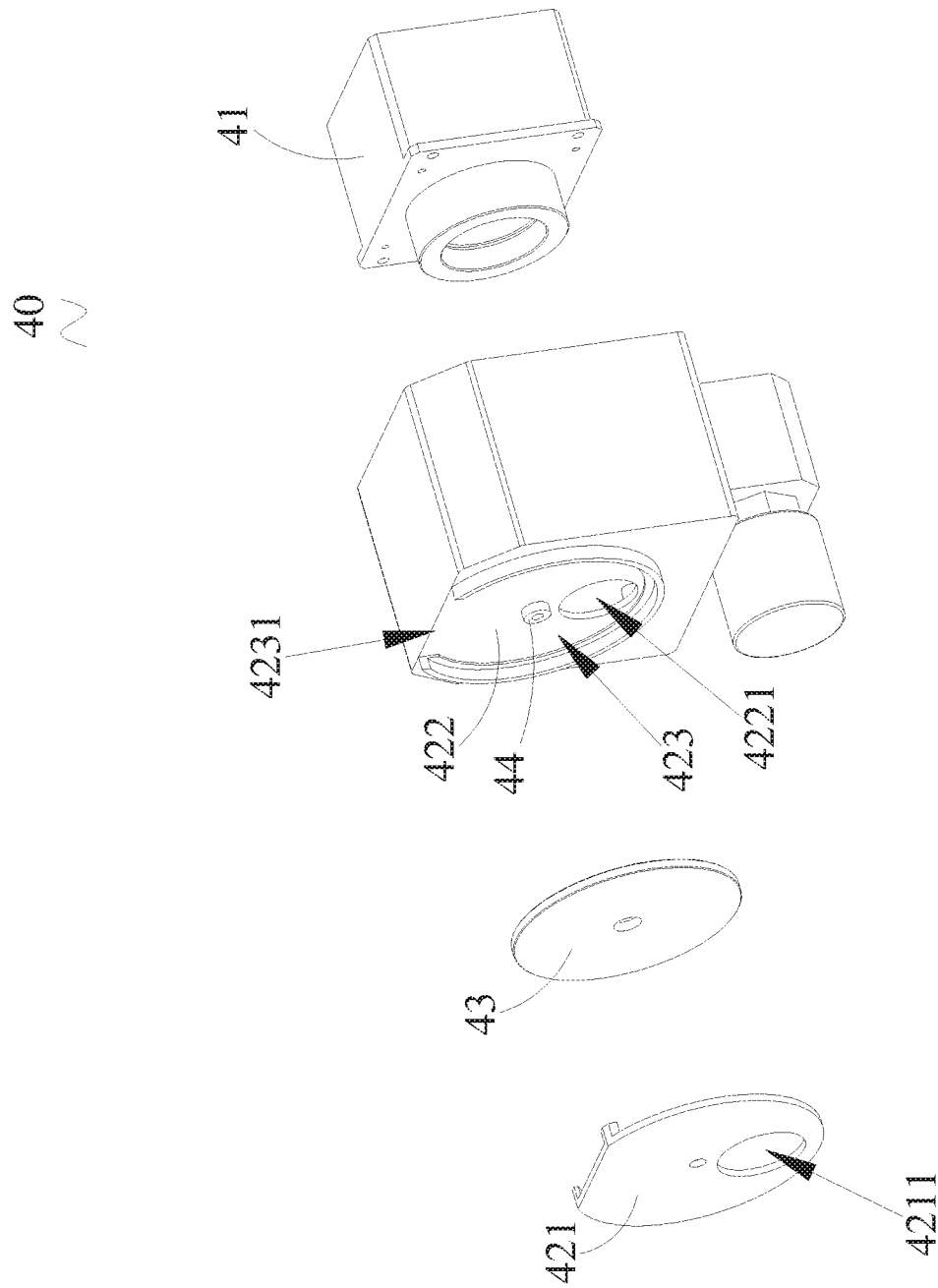
FIG. 7 is an exploded view showing the molten pool observation module according to an embodiment of the present invention.
Figure 8:
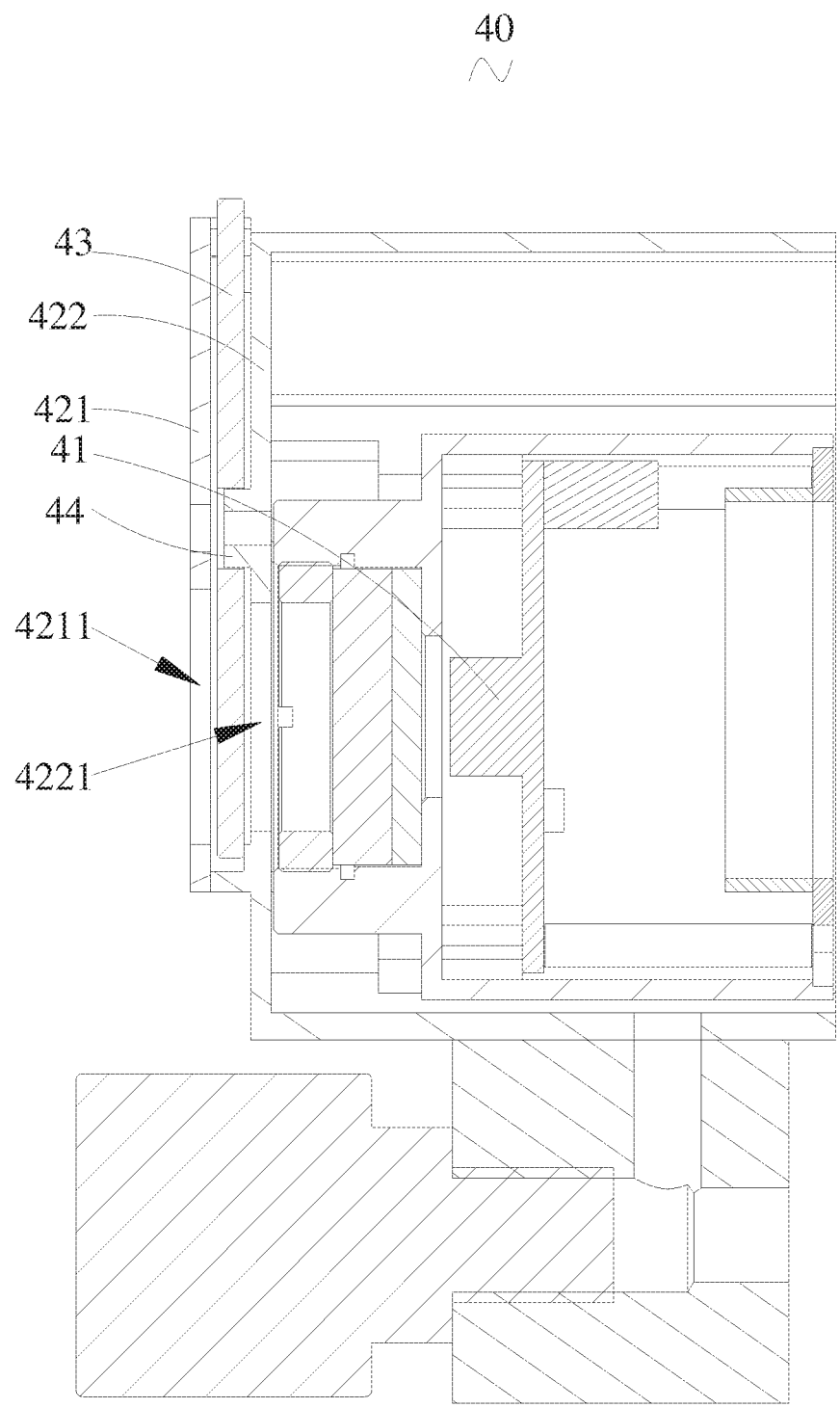
FIG. 8 is a cross-sectional view showing the molten pool observation module according to an embodiment of the present invention.
Figure 9:
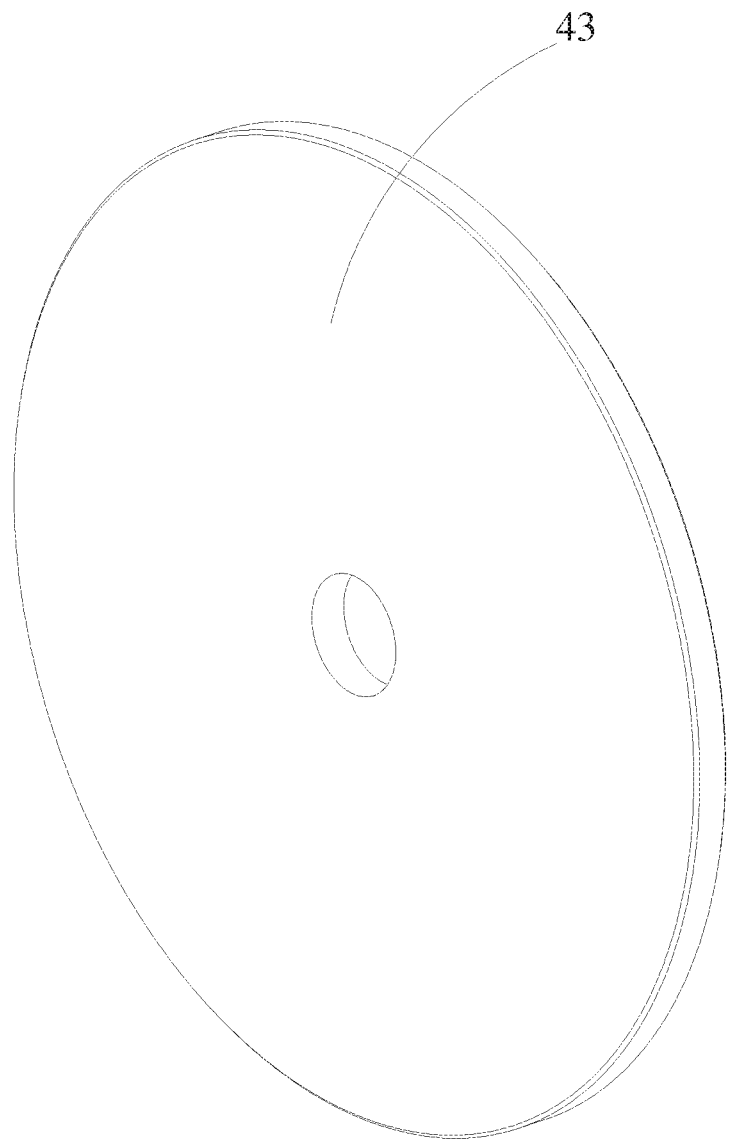
FIG. 9 is a perspective view showing a light-transmitting baffle according to an embodiment of the present invention.
Figure 10:
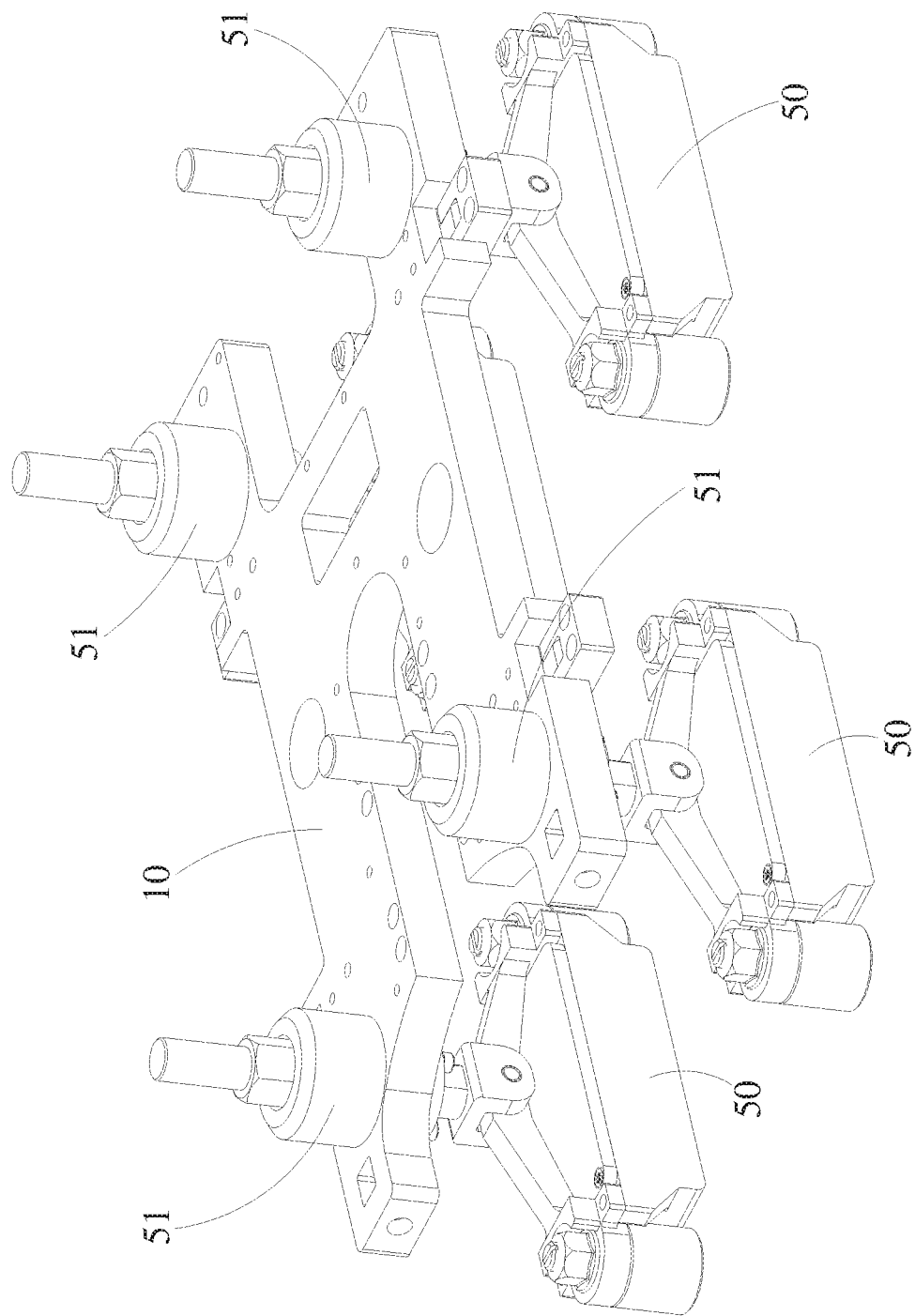
FIG. 10 is a schematic diagram showing installation of a magnetic adsorption device and a vehicle chassis according to an embodiment of the present invention.
Figure 11:
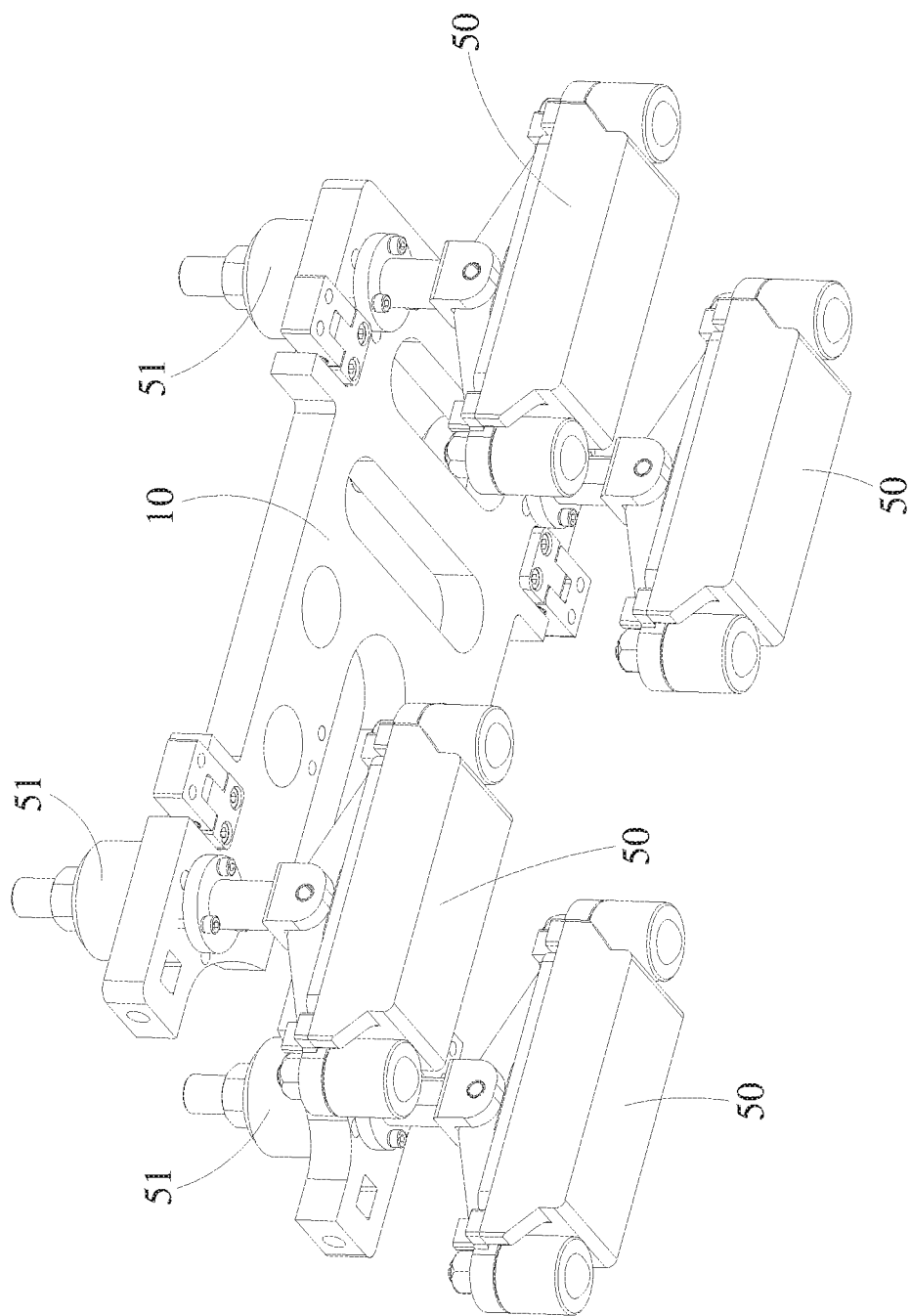
FIG. 11 is a schematic diagram showing installation of a magnetic adsorption device and a vehicle chassis according to an embodiment of the present invention.
Figure 12:
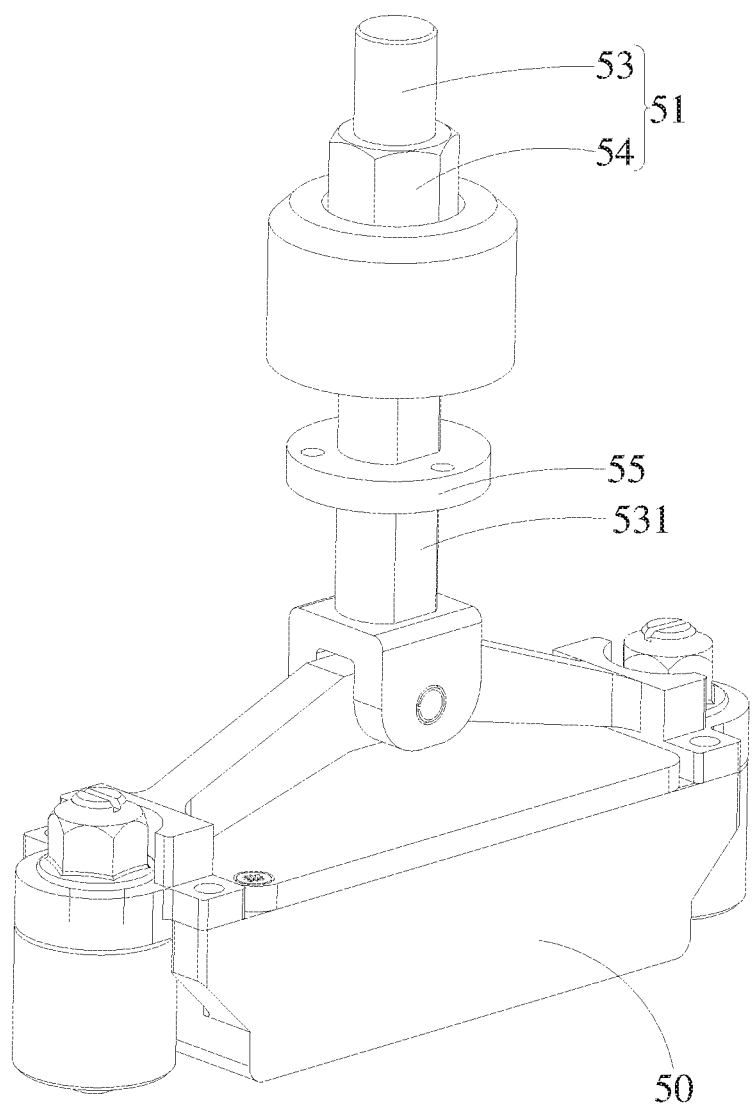
FIG. 12 is a schematic diagram showing the installation of a lifting mechanism and the magnetic adsorption device according to the embodiment of the present invention.
Figure 13:
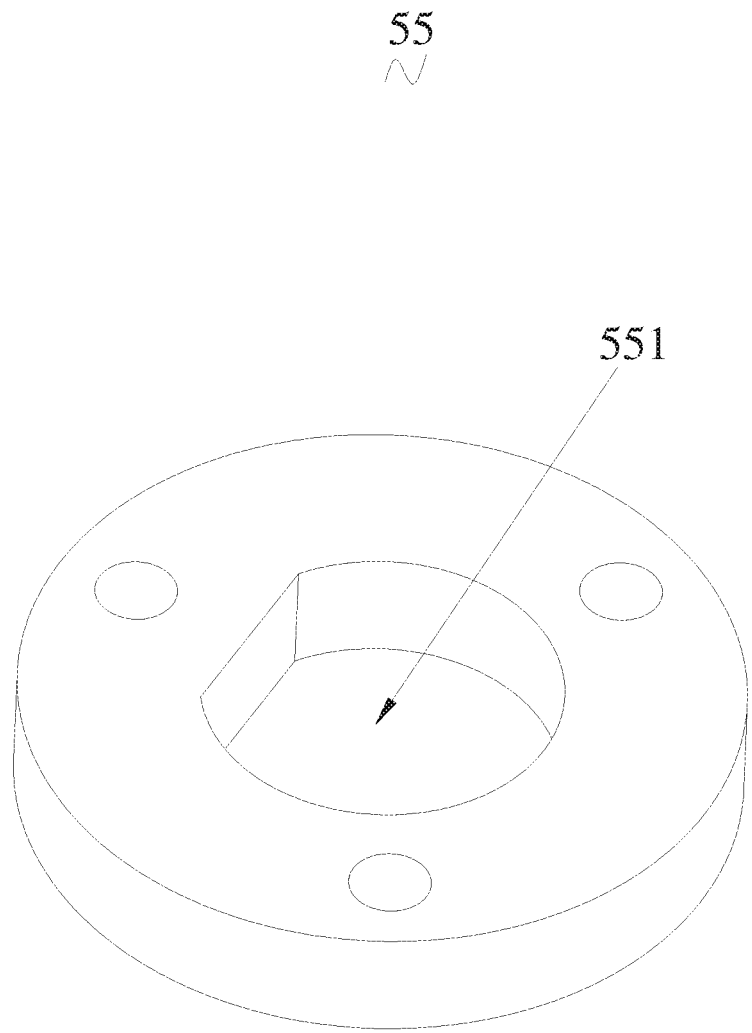
FIG. 13 is a perspective view showing a circumferential stopper according to an embodiment of the present invention.
Figure 14:
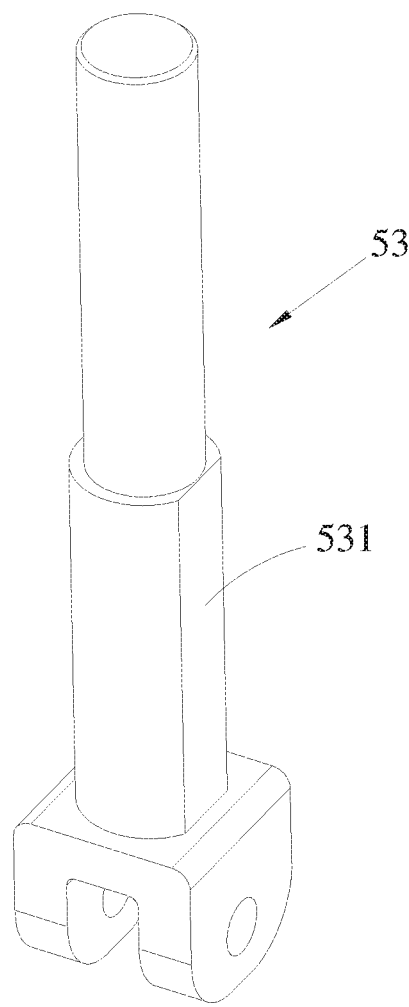
FIG. 14 is a perspective view showing an adjusting screw according to an embodiment of the present invention.
Figure 15:
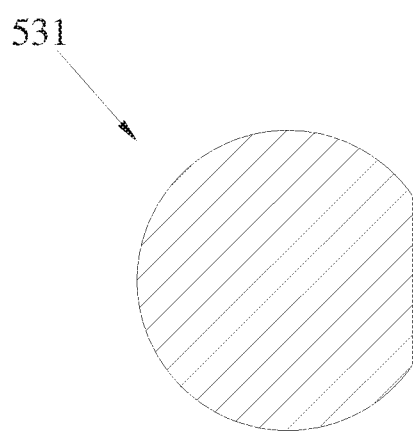
FIG. 15 is a cross-sectional view showing a sliding connection section according to an embodiment of the present invention.
Figure 16:
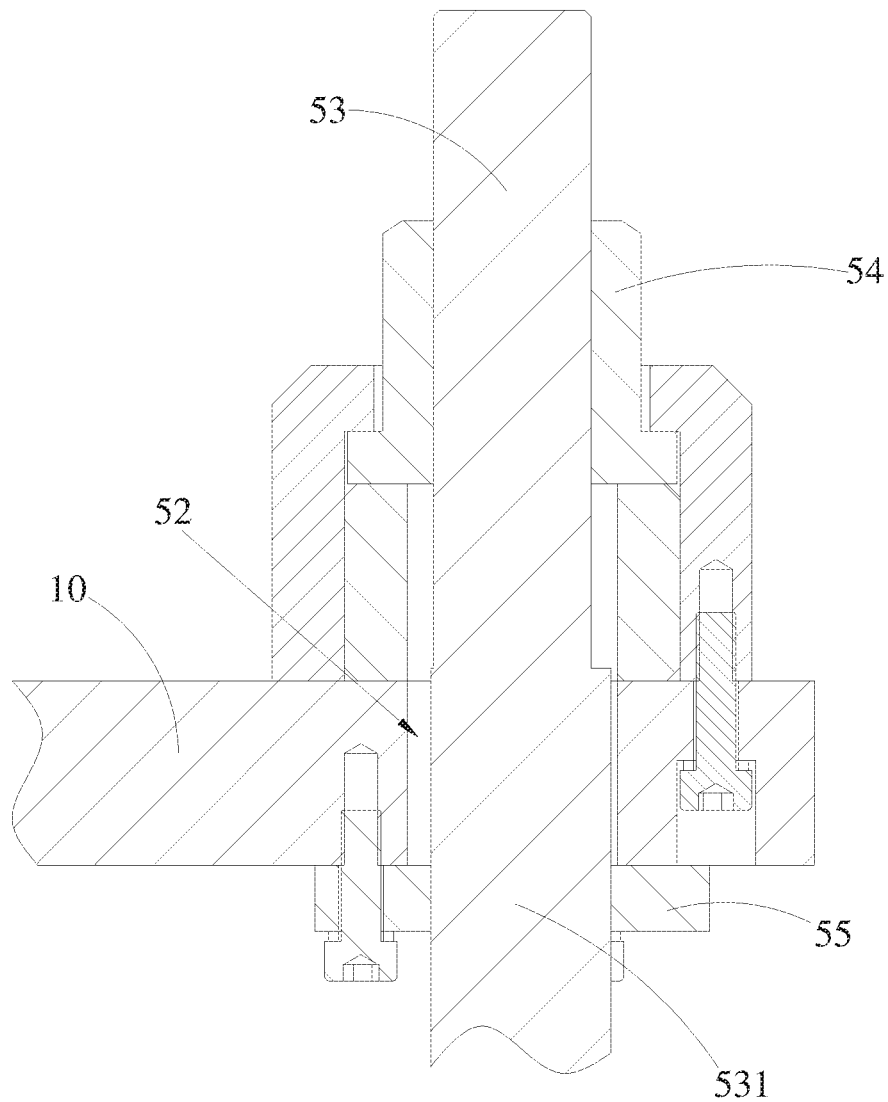
FIG. 16 is an exploded view showing the lifting mechanism according to an embodiment of the present invention.

As shown in FIGS. 1 to 4, the crawling welding robot further includes hinges 20, through which two wheel carriers 31 are connected to the vehicle chassis 10. The hinges 20 are rotatably connected with the wheel carriers 31 and/or the vehicle chassis 10. Rotation axes of the hinges 20 extend along the moving direction of the crawler wheels 30. In the embodiment of the present invention, the wheel carriers 31 are connected with the vehicle chassis 10 through the hinges 20. The hinges 20 may only be rotatably connected with the wheel carriers 31, may only be rotatably connected with the vehicle chassis 10, or may be rotatably connected with the wheel carriers 31 and the vehicle chassis 10. This structure can enable the crawler wheel 30 to adjust its posture relative to the vehicle chassis 10, and the rotation axes of the hinges 20 to extend along the moving direction of the crawler wheel 30, that is, the crawler wheel 30 can swing vertically with respect to the vehicle chassis 10, as shown in FIG. 3, to adapt to different non-planar surface for welding.

As shown in FIGS. 5 to 9, the crawling welding robot further includes a molten pool observation module 40 for observing the welding condition of a welding torch 80. The molten pool observation module 40 includes a camera component 41 for photographing a molten pool 90, and a shielding component for shielding from spatters, which the shielding component includes a first shielding member 421 having a first light-transmitting hole 4211, and a light-transmitting baffle 43 located between the first shielding member 421 and the camera component 41 and covering the first light-transmitting hole 4211 to be shielded from the spatters. The camera component 41 photographs the molten pool 90 through the first light-transmitting hole 4211. The area of the light-transmitting baffle 43 is at least twice the area of the first light-transmitting hole 4211 and can be moved relative to the first light-transmitting hole 4211, so that a varied region of the light-transmitting baffle 43 may cover the first light-transmitting hole 4211.

As shown in FIGS. 5 to 9, the molten pool observation module 40 according to an embodiment of the present invention includes a camera component 41, a first shielding member 421 having a first light-transmitting hole 4211, and a light-transmitting baffle 43 covering a first light-transmitting hole 4211. The area of the light-transmitting baffle 43 is at least twice the area of the first light-transmitting hole 4211 and can be moved relative to the first light-transmitting hole 4211. During the welding process, the spatters will pass through the first light-transmitting holes 4211 to be adhered to the side of the light-transmitting baffle 43 facing the molten pool 90, and the spatters will only be adhered to the region of the light-transmitting baffle 43 corresponding to the first light-transmitting hole 4211. When the spatters are excessively adhered to affect the photographing effect of the camera component 41, the light-transmitting baffle 43 can be moved so that other region of the light-transmitting baffle 43 without the adhered spatters covers the first light-transmitting hole 4211, enhancing the light transmittance of the light-transmitting baffle 43, thereby improving the photographing effect of the camera component 41. In the molten pool observation module 40 according to the embodiment of the present invention, when the spatters are excessively adhered to the region of the light-transmitting baffle 43 corresponding to the first light-transmitting hole 4211, the light-transmitting baffle 43 is just moved so that the clean region of the light-transmitting baffle 43 is aligned with the first light-transmitting hole 4211 to continue the welding operation. Only after all regions of the light-transmitting baffle 43 are contaminated, it is necessary to clean or replace the light-transmitting baffle 43, which greatly reduces the frequency of cleaning or replacing the light-transmitting baffle 43, reduces labor costs and improves work efficiency.

As shown in FIGS. 5 to 9, it can be understood that the light-transmitting baffle 43 moves relative to the first light-transmitting hole 4211 by means of translation, rotation, etc., as long as the clean region of the light-transmitting baffle 43 is aligned with the first light-transmitting hole 4211. The light-transmitting baffle 43 may be manually or electrically moved and the movement is not limited thereto. All light or only light with a specific wavelength may be allowed to pass through the light-transmitting baffle 43, as long as the camera component 41 can capture the welding condition.

As shown in FIGS. 5 to 9, the molten pool observation module 40 further includes a rotating shaft 44, with which the light-transmitting baffle 43 is rotatably connected. Based on this configuration, the light-transmitting baffle 43 is rotatably moved in the embodiment of the present invention, which can greatly save the installation space required for the light-transmitting baffle 43 and is beneficial to the miniaturization of the design of the molten pool observation module 40. In this embodiment, there is no limitation on the installation position of the rotating shaft 44, as long as the light-transmitting baffle 43 can rotate around it and move relative to the first light-transmitting hole 4211.

As shown in FIGS. 5 to 9, the shielding component further includes a second shielding member 422 located between the first shielding member 421 and the camera component 41. The second shielding member 422 is provided with a second light transmitting hole 4221 opposite to the first light transmitting hole 4211. The camera component 41 photographs the molten pool 90 through the first light transmitting hole 4211 and the second light transmitting hole 4221. The first light transmitting hole 4211 and the second light transmitting hole 4221 cooperate to define an accommodating space 423 therebetween, within which the light-transmitting baffle 43 is located. The rotating shaft 44 is connected with the first and/or second shielding member. In the embodiment of the present invention, since the light-transmitting baffle 43 is disposed in the accommodating space 423, the light-transmitting baffle 43 can be prevented from being contaminated by external impurities, so that usage time of the light-transmitting baffle 43 can be further prolonged, and its frequency of cleaning or replacement can be reduced, thereby reducing the labor costs and improving the work efficiency.

As shown in FIGS. 5 to 9, the light-transmitting baffle 43 is of a cylindrical shape, and the rotating shaft 44 is rotatably connected to a center of the light-transmitting baffle 43. The accommodating space 423 has a gap 4231, at which the light-transmitting baffle 43 is exposed. Due to the above configuration that a portion of the light-transmitting baffle 43 is exposed at the notch 4231 of the accommodating space 423, when the light-transmitting baffle 43 is required to be rotated, only the exposed portion of the light-transmitting baffle 43 needs to be manually pushed to drive the light-transmitting baffle 43 to rotate, so that the clean region of the light-transmitting baffle 43 is aligned with the first light transmitting hole 4211. Therefore, the light-transmitting baffle is easy and quick to be operated.

As shown in FIGS. 10 to 16, the crawling welding robot further includes magnetic adsorption devices 50 for adsorbing the workpiece to be welded and lifting mechanisms 51 disposed on the vehicle chassis 10 and configured for raising and lowering the magnetic adsorption devices 50. The vehicle chassis 10 is provided with through holes 52. The lifting mechanism 51 includes an adjusting screw 53 passing through the through hole 52 and connected at one end with the magnetic adsorption device 50, and an adjusting nut 54 located at the side of the vehicle chassis 10 away from the magnetic adsorption device 50 and threadedly connected with the adjusting screw 53. The lifting mechanism 51 further includes a circumferential stopper 55 fixedly disposed to the vehicle chassis 10 and configured for restricting the rotation of the adjusting screw 53.

As shown in FIGS. 10 to 16, in the crawling welding robot according to the embodiment of the present invention, the lifting mechanism 51 for raising and lowering the magnetic adsorption device 50 includes the adjusting screw 53 and an adjusting nut 54 screwed to the adjusting screw 53. The vehicle chassis 10 is further provided with the circumferential stopper 55 that can restrict the rotation of the adjusting screw 53, so that during raising and lowering the magnetic adsorption device 50 by rotating the nut, the circumferential stopper 55 can restrict the rotation of the adjusting screw 53 and force the adjusting screw 53 to be moved only in its axial direction, thereby avoiding the invalid lifting adjustment. In addition, since the circumferential stopper 55 restricts the rotation of the adjusting screw 53, the magnetic adsorption device 50 is also prevented from rotating with the adjusting screw 53, further avoiding the technical problem that the magnetic adsorption device 50 impacts the crawler wheels 30 of the crawler welding robot to interfere with the crawling welding robot's moving.

As shown in FIGS. 10 to 16, the circumferential stopper in the embodiment of the present invention is a member capable of preventing the rotation of the screw along its axial direction (that is, lifting movement) during the process of rotating the nut. It can be understood that the adjusting screw 53 and the adjusting nut 54 are provided with mutually matching threads. When the nut is screwed, the adjusting screw 53 can be caused to move upwardly and downwardly, thereby driving the magnetic adsorption device 50 to move upwardly and downwardly. The magnetic adsorption device 50 in the embodiment of the present invention may be a permanent magnet or an electromagnet.

As shown in FIGS. 10 to 16, the circumferential stopper 55 has a clamping hole 551 and is disposed around the adjusting screw 53. The clamping hole 551 of the circumferential stopper 55 clamps on an outer periphery of the adjusting screw 53 to restrict the rotation of the adjusting screw 53. In particular, when the adjusting nut 54 is screwed, the clamping hole 551 restricts the rotation of the adjusting screw 53, so that the screw moves upwardly and downwardly relative to the vehicle chassis 10, and then drives the magnetic adsorption device 50 to move upwardly and downwardly. Specifically, the clamping hole 551 is D-shaped, and the adjusting screw 53 includes a sliding connection section 531 that slidably cooperates with the clamping hole 551. The cross-sectional shape of the sliding connection section 531 corresponds to that of the clamping hole 551 and is thus D-shaped as shown in figures. It can be understood that since the clamping hole 551 is D-shaped, and the cross section of the sliding connection section 531 is also D-shaped, the adjustment screw 53 is unable to rotate relative to the circumferential stopper 55, but the adjustment screw 53 can move relative to the circumferential stopper 55 in its axial direction. Therefore, the adjustment screw 53 performs the lifting movement without rotation, realizing the effective lifting adjustment and preventing the rotation of the magnetic adsorption device 50 from interfering with the moving of the crawler wheel 30. The above-mentioned circumferential stopper 55 has a simple configuration and a low manufacturing cost. The circumferential stopper 55 is fixedly disposed on a side of the vehicle chassis 10 that is away from the adjusting nut 54.

As shown in FIGS. 10 to 16, the crawler wheel 30 further includes a first tensioning mechanism 60 connected to the wheel carrier 31 and configured for adjusting the tension of the chain 34 in a first direction, and a second tensioning mechanism 70 connected to the wheel carrier 31 and configured for adjusting the tension of the chain 34 in a second direction different from the first direction.

Figure 17:
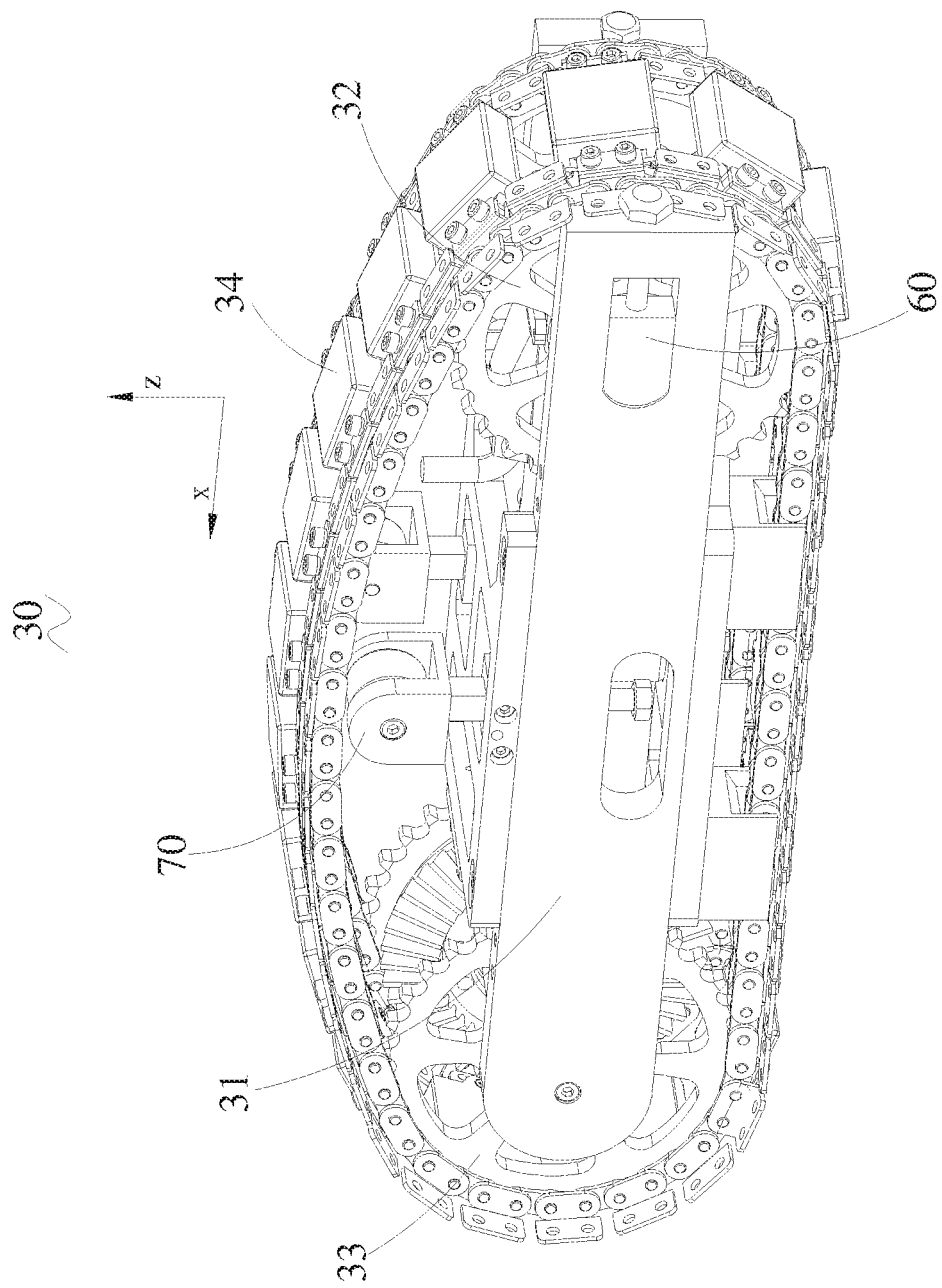
FIG. 17 is a perspective view showing a crawler wheel according to an embodiment of the present invention.

As shown in FIG. 17, a crawler assembly according to the embodiment of the present invention includes a first tensioning mechanism 60 and a second tensioning mechanism 70. The first tensioning mechanism 60 can adjust the tension of the chain 34 in a first direction, and the second tensioning mechanism 70 can adjust the tension of the chain 34 in a second direction. When the crawling welding robot does not reserve enough space for the swing of the chain 34 in the first direction, the chain 34 may be tensioned in the second direction via the second tensioning mechanism 70. The first tensioning mechanism 60 can also be used to provide a portion of the tension amount, and the second tensioning mechanism 70 can provide the remaining portion of the tension amount. The tension of the chain 34 is carried out by a total of two tension amount. When the first tensioning mechanism 60 does not have enough space to fully tension the chain 34, the crawler assembly according to the embodiment of the present invention can tension the chain 34 by the second tensioning mechanism 70, thereby achieving the more flexible tensioning method. Preferably, the first direction is a lateral direction consistent with the moving direction of the crawler wheel 30, such as the x direction shown in FIG. 17, and the second direction is a longitudinal direction perpendicular to the lateral direction, such as the z direction shown in FIG. 17. The tensioning method of the first tensioning mechanism 60 and the second tensioning mechanism 70 is the same as the existing tensioning method, as long as the chain 34 can be tensioned, which will not be repeated here.

The above are only the preferred embodiments of the present invention and are not intended to limit the present invention. Any modification, equivalent replacement and improvement made within the spirit and principle of the present invention should be included within the protection range of the present invention.

What is claimed is:

1. A crawling welding robot for crawling on a workpiece to be welded and welding the workpiece to be welded, comprising a vehicle chassis, two crawler wheels connected to two opposite sides of the vehicle chassis, respectively, and a welding torch connected to the vehicle chassis and used for welding, wherein the crawler wheels each comprises a wheel carrier, a first sprocket and a second sprocket rotatably connected to two ends of the wheel carrier respectively, and a chain disposed around the first sprocket and the second sprocket, wherein the wheel carriers of the two crawler wheels are movably connected to the opposite sides of the vehicle chassis, respectively, the crawling welding robot comprises hinges, through which the two wheel carriers are connected to the vehicle chassis, and wherein the hinges are rotatably connected to the wheel carrier and/or the vehicle chassis, and each have a rotation axis extending in a moving direction of the crawler wheels, the crawling welding robot further comprises a magnetic adsorption device configured to adsorb the workpiece to be welded and a lifting mechanism disposed on the vehicle chassis and configured for raising and lowering the magnetic adsorption device.

2. The crawling welding robot according to claim 1, wherein the crawling welding robot further comprises a molten pool observation module for observing welding conditions of the welding torch; the molten pool observation module comprises a camera component for photographing the molten pool and a shielding component for shielding spatters, the shielding component comprises a first shielding member having a first light-transmitting hole, and a light-transmitting baffle located between the first shielding member and the camera component and covering the first light-transmitting hole to be shielded from the spatters; the camera component is configured to photograph the molten pool through the first light-transmitting hole; and an area of the light-transmitting baffle is at least twice an area of the first light-transmitting hole and is movable relative to the first light-transmitting hole, so that a varied region of the light-transmitting baffle covers the first light-transmitting hole.

3. The crawling welding robot according to claim 1, wherein the molten pool observation module further comprises a rotating shaft, to which the light-transmitting baffle is rotatably connected.

4. The crawling welding robot according to claim 3, wherein the shielding component further comprises a second shielding member located between the first shielding member and the camera component, the second shielding member is provided with a second light transmitting hole opposite to the first light transmitting hole, the camera component is configured to photograph the molten pool through the first light transmitting hole and the second light transmitting hole, the first light transmitting hole and the second light transmitting hole cooperate to define an accommodating space therebetween, within which the light-transmitting baffle is located, and the rotating shaft is connected with the first and/or second shielding member.

5. The crawling welding robot according to claim 4, wherein the light-transmitting baffle is of a cylindrical shape, the rotating shaft is rotatably connected to a center of the light-transmitting baffle, and the accommodating space has a notch, at which the light-transmitting baffle is exposed.

6. The crawling welding robot according to claim 1, wherein the vehicle chassis is provided with through holes, the lifting mechanism comprises an adjusting screw passing through the through hole and connected at one end with the magnetic adsorption device, and an adjusting nut located at a side of the vehicle chassis away from the magnetic adsorption device and threadedly connected with the adjusting screw, and the lifting mechanism further comprises a circumferential stopper fixedly disposed at the vehicle chassis and configured for restricting a rotation of the adjusting screw.

7. The crawling welding robot according to claim 6, wherein the circumferential stopper has a clamping hole and is disposed around the adjusting screw, the clamping hole is D-shaped and clamps on an outer periphery of the adjusting screw to restrict the rotation of the adjusting screw, the adjusting screw includes a sliding connection section which slidably cooperates with the clamping hole, and a cross-sectional shape of the sliding connection section matches the shape of the clamping hole and is D-shaped.

8. The crawling welding robot of claim 1, wherein the crawler wheel further comprises a first tensioning mechanism connected to the wheel carrier and configured for adjusting a tension of the chain in a first direction, and a second tensioning mechanism connected to the wheel carrier and configured for adjusting a tension of the chain in a second direction different from the first direction.

9. The crawling welding robot according to claim 8, wherein the first direction is a lateral direction consistent with a moving direction of the crawler wheel, and the second direction is a longitudinal direction perpendicular to the lateral direction.

* * * * *